May 26, 1942.  J. N. INSUA  2,284,521
WIND MOTOR WITH VARIABLE PITCH AUTOMATIC SPEED CONTROL
Filed May 3, 1940
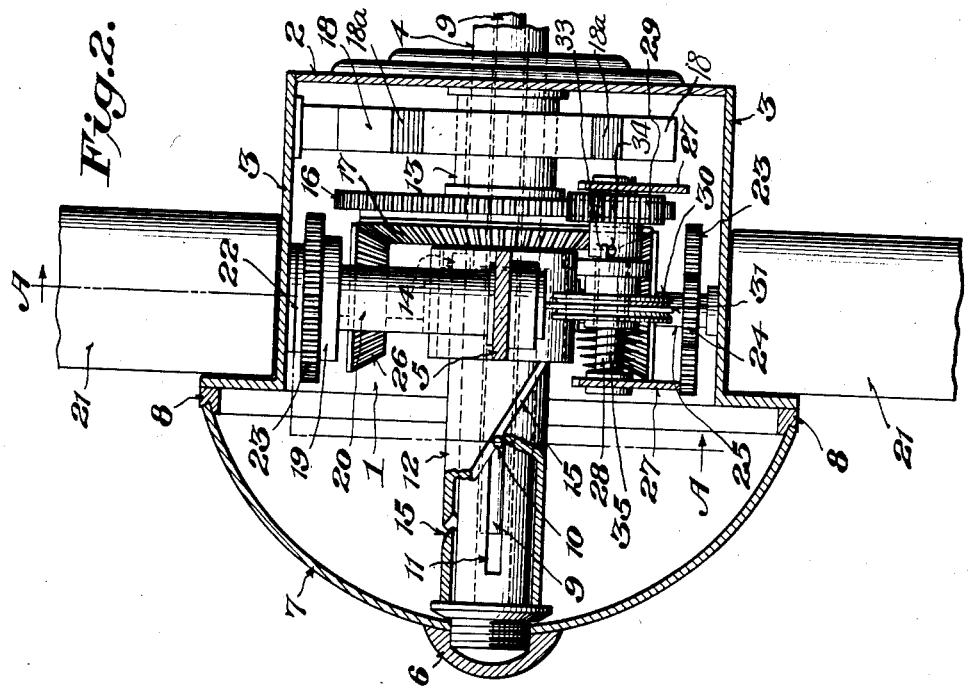
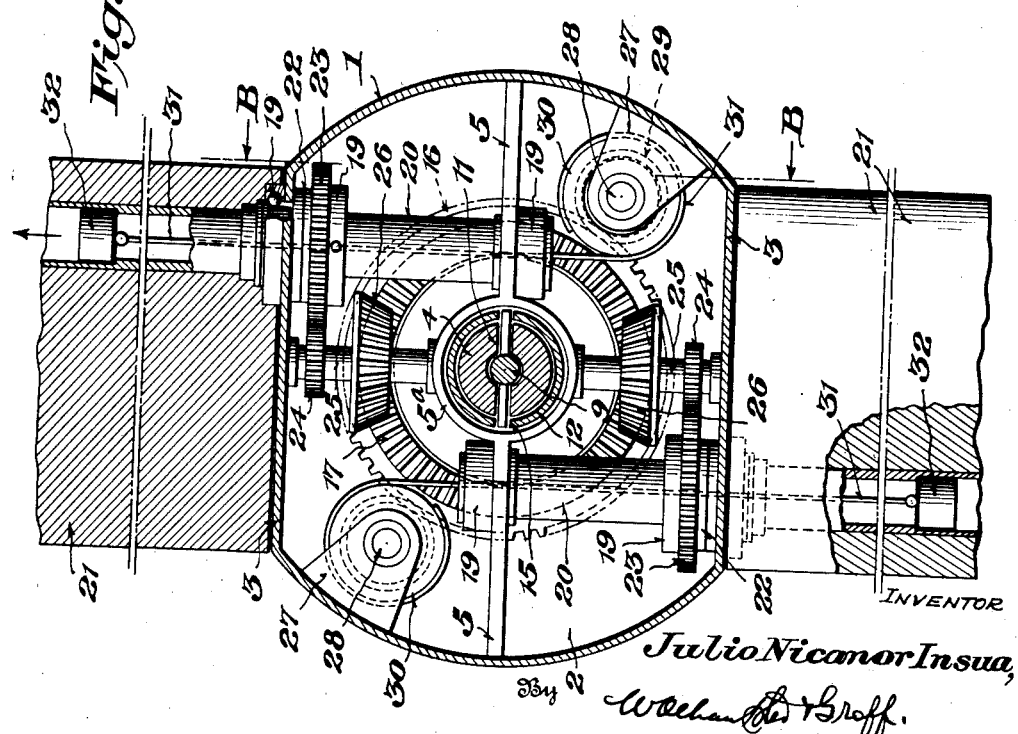

Patented May 26, 1942

2,284,521

UNITED STATES PATENT OFFICE 2,284,521

WIND MOTOR WITH VARIABLE PITCH
AUTOMATIC SPEED CONTROL

Julio Nicanor Insua, Buenos Aires, Argentina

Application May 3, 1940, Serial No. 333,220
In Argentina April 1, 1940

2 Claims. (Cl. 170—68)

This invention relates to a novel and improved type of wind motor screw propeller, of adjustable pitch, for the operation of dynamos and other machinery or mechanical devices by the action of wind, and substantially has for object a new type of screw propeller for a wind motor, which owing to its excellent features of construction and operation and its efficient automatic speed controlling means offers considerable advantages over all other constructions of similar kind, heretofore used or proposed.

The improved type of screw propeller which forms the object of this invention, is particularly adapted for propelling dynamos for generating electric current by the action of wind, although it will be evident that the device may also conveniently be used as a propelling means for operating other suitable types of machinery or mechanisms in general.

The invention also has in view other objects which will be understood from the following specification.

In order that this invention may be clearly understood and readily carried into practice, a preferred embodiment of the same has been shown by way of example in the illustrative drawings annexed to this specification, in which:

Figure 1 shows a detailed front view of the improved type of wind motor screw propeller in accordance with the features of this invention, partially sectional, along the line A—A of Figure 2, for better showing the automatic pitch adjusting means, and Figure 2 is a longitudinal and partial section of the screw propeller, taken on the line B—B of Figure 1.

In said drawing, the same characters have been used to indicate like or corresponding parts.

In the embodiment shown, the novel type of screw propeller which forms the object of this invention, substantially consists of a casing 1, of essentially cylindrical shape, closed at one of its ends by a back plate 2 and at two diametrically opposite parts of its contour, by two flat walls 3, of suitable width.

With reference to said figures it will be further seen that a tubular shaft 4, suitably journalled on a frame member, not shown, for supporting the same, is provided with means (not shown) for directly or indirectly coupling the same to a dynamo or other machine or mechanism to be driven thereby. Said shaft 4 which is to act as a drive shaft, is supported from the back plate 2 of said casing by means of an intermediate supporting plate member 5, comprising a bearing or housing 5a secured to the inner part of the casing. At its free end, shaft 4 is threaded to receive a nut 6 or similar device, in order to hold in position a cover 7 of suitable shape, preferably seated against a shoulder 8, formed in the front end of said casing, for closing the same.

Within the bore of said shaft 4, a slidable rod 9 is mounted and a pin 10 is arranged to diametrically extend through said rod 9, being adapted to slide within two longitudinal slots 11, formed at the opposite walls of said shaft, so as to limit the stroke of said rod and assure, at the same time, a perfectly rectilinear sliding motion of the same.

On the outside, two tubular bushings 12 and 13 are rotatably mounted on said motor shaft 4, the adjacent ends of said bushings being formed with suitable clutch teeth 14 or similar coupling means, for the purpose of assuring the mechanical engagement of said two bushings in the operative position of the same.

The front bushing 12 of said two bushings is provided with two diametrically opposed helical slots 15, within which may freely slide the extended ends of the pin 10, above referred to and which, as stated, is made integral with the slidable rod 9.

The second member 13 of said two bushings is made integral with a toothed crown 16 which is fixedly secured to a bevel gear 17, preferably seated against the inner side of said crown. To the bushing 13 is also secured, so as to form an integral part thereof, a spiral leaf spring 18a, after the manner of a watch spring, housed within a protecting casing 18, affixed by any suitable or convenient means to the inside of the outer casing 1.

It will also be noted when referring to the drawing, that at symmetrically diametrically opposed places of said wall 3 and of supporting members 5, the two tubular shafts 20 are suitably supported by means of ball bearings 19 or the like, providing radial and thrust bearing, and are axially secured into the adjacent ends of the blades 21 of the propeller and which shafts 20 support blades 21 rotatably and adjustably from casing 1 and end plates 3; a third ball bearing 22, providing axial thrust, acts to prevent any possible longitudinal shifting of said shafts 20 and blades 21, and thus assure the necessary stability of the elements described.

To each of said two shafts 20 are suitably secured respectively two gear wheels 23, adapted for engaging respectively with two similar gear wheels 24, of smaller diameter, which are formed integral with spindles 25, which are mounted colinearly and are suitably mounted to rotate in independent bearings supported between the elements 3 and 5. To each of said spindles 25 there is keyed a small bevel gear 26, adapted for engaging, at two diametrically opposite points, with the aforementioned toothed crown 17.

It will also be seen, that at two opposite places of the casing 1, brackets 27 are secured, in which is suitably journalled a shaft 28, at each said place, made integral with a small toothed pinion 29, in permanent gear with the toothed wheel 16, above described. On each of said shafts 28, in turn, is mounted a small idle grooved pulley 30, in the groove of which is wound a cable 31 or like suitable means, which passes through the bore of the shafts 20. The opposite end of cable 31 is connected to a weight 32, adapted to move by centrifugal action along the said bore. On the other hand, a small rod 33 extends from the side of said pulley 30 and is adapted to abut against a stop 34, provided on said toothed pinions 29, so as to transmit the rotary motion from one of the elements to the other. A small spring 35, of spiral or other convenient type, acts by pressure against the opposite side of said pulleys 30, so as to assure the permanent engagement between said rod 33 and the stop 34.

The operation of the improved construction of wind motor propeller is most simple and takes place in the manner now to be described:

Owing to the pressure exerted by the wind on the blades 21, the entire mechanism, together with the casing 1 and the motor shaft 4, will start rotating, and the rotary motion of the shaft 4 will be transmitted, either directly or through a speed multiplying or reducing device, to the power generating mechanism, machine or dynamo, as may be required.

When the pressure of the wind does not rise above a certain value of force, the rotation of the assembled rotating parts of the device will be rather slow and the weights 32, arranged in the interior of each blade 21, will be held in a retracted position. This is due to the small amount of centrifugal force to which they are then being submitted, as well as to the opposing action of the spiral spring 18a enclosed within the housing 18 which acts on the supporting pulleys 30 of said wheels which carry weights 32 by means of the bushing 13, wheel 16, pinion 29 and the coupling device formed by the rods 33 and the stops 34.

The tension force exerted by said spiral spring on the bushing 13 is initially adjusted so that when the propeller rotates at a reduced speed, lower than 500 R. P. M., for instance, the effect of the spring will overcome the action exerted by the centrifugal force on the weights 32, so that as long as said speed is kept below said predetermined value, the weights will continue in their position close to the center of rotation of the assembly.

If, however, owing to an increase in the pressure of the wind or a decrease in the load, the speed of the propeller should exceed the value referred to, or any other predetermined degree of speed, then the centrifugal action will shift the weights 32 toward the ends of the blades 21, as indicated by the arrows in Figure 1, and said weights will cause, by means of the cables 31, a certain amount of rotation of the pulleys 30; these latter, through the rods 33 and stops 34 will cause the rotation of the pinions 29 which, in turn, by means of the toothed crown 16, the integral crown 17, pinions 26 and 24 and wheels 23, will cause a certain amount of rotation of the shafts 20 of the blades 21, in opposite directions, thereby varying the pitch of the propeller, that is, the angle of incidence of the plane of attack of each blade to the direction of the wind and decreasing, in consequence, the component of pressure of the wind, whereby the tendency for increase in speed of said propeller will be controlled and compensated.

The same phenomena, but in an opposite sense, will occur in connection with any decrease in the speed of rotation of the propeller, so that by suitably adjusting the values of the weights 32 and the tension of the opposing spring 18a enclosed in the housing 18, a practically constant speed of rotation may be obtained, in accordance with the purpose in view.

When it is desired to stop the rotation of the propeller, traction is applied to the free end of the rod 9, by means of a hand lever or other suitable device, so as to cause the pin 10 to slide along the slots 11 and 15, and owing to the helical shape of these latter, the bushing 12 will rotate on the shaft 4. Said bushing 12, through its coupling member 14, will in turn cause the rotation of the adjacent bushing 13 with its integral members 16 and 17, of which latter, the member 17 will bring about, by means of the gears 26, 24 and 23, the rotation of the shafts 20 of the blades 21, until the planes of attack of said blades will coincide with the resultant of the direction of the wind, which, thereupon, will no longer apply force to the blades.

During the rotation of said gear 16, the pinions 29 will revolve idle on their axles, owing to the arrangement of the retaining means formed by the rods 33 and stops 34, without causing any movement of the pulleys 30 and, in consequence, of the weight 32 connected to the same.

From what has been explained, the operation of the device will be readily understood and no further description of the same will be required by persons skilled in the art.

It will be evident that several modifications of construction and detail may be introduced, without departing from the scope of this invention, as clearly determined by the claims annexed to this specification.

Having now particularly described and ascertained the nature of my said invention and in what manner the same is to be performed, I declare that what I claim as new and desire to secure by Letters Patent is:

1. In a wind motor, a rotatably supported drive shaft, a mounting casing mounted on said shaft, a hollow pitch adjusting shaft rotatably mounted on said casing and extending in a plane substantially perpendicular to the axis of said drive shaft, a propeller blade mounted on said pitch adjusting shaft and enclosing a portion thereof, a centrifugal weight slidably mounted in the portion of the bore of said pitch adjusting shaft within said blade, a cable drum mounted within said casing, a cable wound on said drum and connected to said weight, a gear wheel idly mounted on said drive shaft, first gear means connecting said gear wheel to said pitch adjusting shaft, second gear means connecting said gear wheel to said drum, and a spring mounted in said casing and adapted to apply to said gear wheel a rotational force which will oppose the rotational force transmitted thereto from said drum as said weight is pulled outwardly by centrifugal force.

2. In a wind motor, a rotatably supported drive shaft, a mounting casing mounted on said shaft, a hollow pitch adjusting shaft rotatably mounted on said casing and extending in a plane substantially perpendicular to the axis of said drive shaft, a propeller blade mounted on said pitch adjusting shaft and enclosing a portion thereof, a centrifugal weight slidably mounted in the portion of the bore of said pitch adjusting shaft within said blade, a cable drum mounted within said casing, a cable wound on said drum and connected to said weight, a gear wheel idly mounted on said drive shaft, first gear means connecting said gear wheel to said pitch adjusting shaft, second gear means connecting said gear wheel to said drum, a spring mounted in said casing and adapted to apply to said gear wheel a rotational force which will oppose the rotational force transmitted thereto from said drum as said weight is pulled outwardly by centrifugal force, and manually actuatable means mounted on said drive shaft and adapted to apply to said gear wheel a rotational moment for varying the angular orientation of said pitch adjusting shaft independently of said spring.

JULIO NICANOR INSUA.